(12) United States Patent
Krenzer

(10) Patent No.: US 7,008,150 B2
(45) Date of Patent: Mar. 7, 2006

(54) TWIST DRILL FOR DRILLING, A DRILL WITH A CUTTING INSERT, AND A REPLACEABLE CUTTING INSERT FOR A TWIST DRILL

(75) Inventor: Ulrich Krenzer, Zirndorf (DE)

(73) Assignee: Kennametal Inc., Latrobe, PA (US)

( * ) Notice: Subject to any disclaimer, the term of this patent is extended or adjusted under 35 U.S.C. 154(b) by 405 days.

(21) Appl. No.: 09/966,735

(22) Filed: Sep. 28, 2001

(65) Prior Publication Data

US 2002/0114675 A1 Aug. 22, 2002

Related U.S. Application Data

(63) Continuation-in-part of application No. PCT/EP00/02515, filed on Mar. 22, 2000.

(30) Foreign Application Priority Data

Mar. 29, 1999 (DE) .......................................... 199 14 170

(51) Int. Cl.
*B23B 51/02* (2006.01)

(52) U.S. Cl. ...................... 408/144; 408/231; 408/713; 408/230

(58) Field of Classification Search ................. 408/144, 408/226, 227, 228, 230, 231, 232, 713
See application file for complete search history.

(56) References Cited

U.S. PATENT DOCUMENTS 967,789 A * 8/1910 Le Baron .................... 408/201

1,104,987 A * 7/1914 Grimes ........................ 408/232
4,744,704 A * 5/1988 Galvefors .................... 408/144
6,514,019 B1 * 2/2003 Schulz ......................... 408/59

FOREIGN PATENT DOCUMENTS

| DE | 94340 | 10/1897 |
|---|---|---|
| DE | 367010 | 1/1923 |
| DE | 4435857 | 4/1996 |
| DE | 19605157 | 9/1996 |
| DE | 19543233 | 5/1997 |
| EP | 0441302 | 7/1995 |
| EP | 0460237 | 3/1996 |
| FR | 1068867 | 7/1954 |
| WO | 9810881 | 3/1998 |

* cited by examiner

Primary Examiner—Daniel W. Howell
(74) Attorney, Agent, or Firm—John J. Prizzi

(57) ABSTRACT

On a drill with a base body and a replaceable cutting insert, the cutting insert lies in a receptacle that runs through the base body at a right angle to the latter's longitudinal axis and is open toward the drill tip, whereby the cutting insert is in contact by means of two diametrically opposite contact surfaces against the side walls of the receptacle. Between each contact surface of the cutting insert and a side wall of the receptacle, there is a groove that extends in the direction of the longitudinal axis, in which groove a clamping wedge sits with a form-fit and a friction-fit, and interacts with the base body and the cutting insert in the manner of a self-locking device that acts toward the drill tip.

20 Claims, 6 Drawing Sheets

Fig. 2
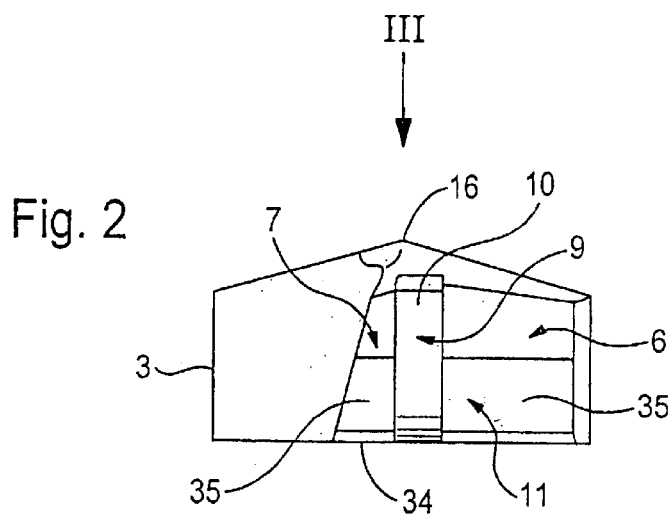
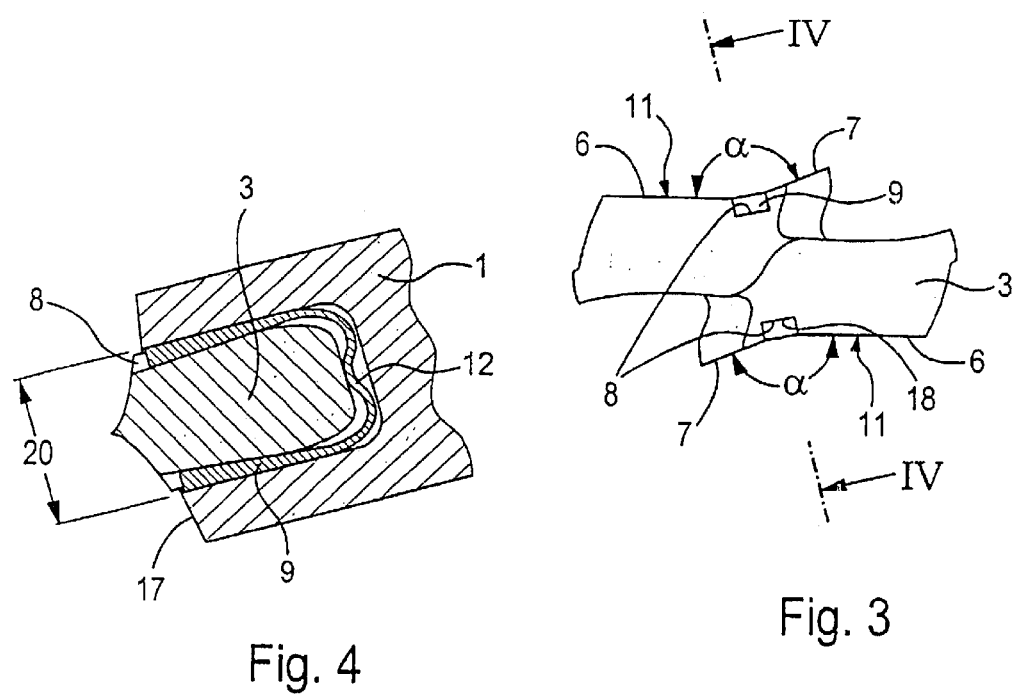
Fig. 4
Fig. 3

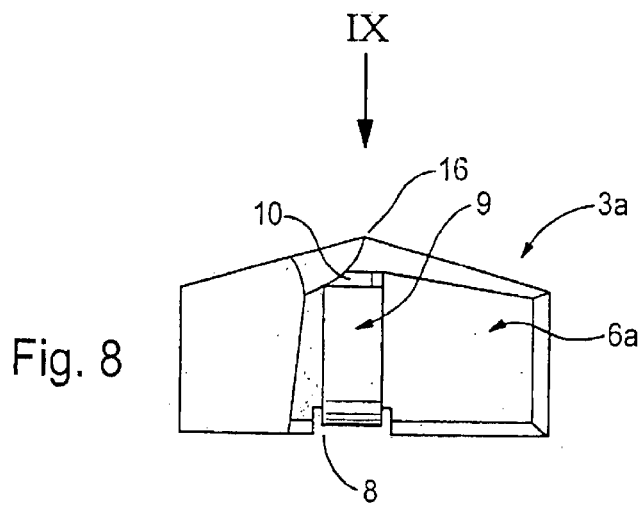
Fig. 8
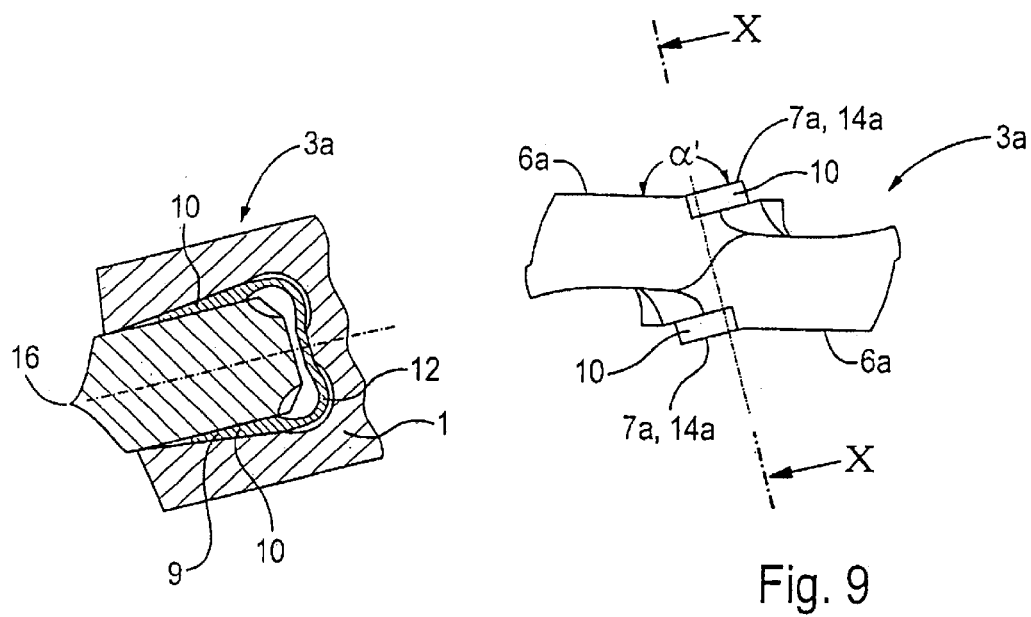
Fig. 10
Fig. 9

TWIST DRILL FOR DRILLING, A DRILL WITH A CUTTING INSERT, AND A REPLACEABLE CUTTING INSERT FOR A TWIST DRILL

CONTINUING APPLICATION DATA

This application is a Continuation-in-part of International Application No. PCT/EP00/02515, filed on Mar. 22, 2000, which claims priority from Federal Republic of Germany Patent Application No. 199 14 170.3, filed on Mar. 29, 1999. The United States was an elected state in International Application No. PCT/EP00/02515. International Application No. PCT/EP00/02515 was pending as of the filing date of this application.

BACKGROUND OF THE INVENTION

1. Field of the Invention

This invention relates to a twist drill for drilling, a drill with a cutting insert, and a replaceable cutting insert for a twist drill.

This invention also relates to a drill with a replaceable cutting insert, whereby the cutting insert sits in a receptacle that runs through the base body at a right angle to its longitudinal axis and opens toward the drill tip, and whereby the cutting insert is in contact with the side walls of the receptacle with two essentially diametrically opposite contact surfaces.

2. Background Information

The modern metalworking trade primarily uses twist drills to make borings. Depending on the application, these twist drills can differ in terms of their cutting material and geometry. The high-speed tool steel (HSS) traditionally used is increasingly being replaced by carbide metal, which has a significantly higher resistance to abrasion. For large drilling tools, however, a drill made entirely of solid carbide metal is generally too expensive, and is not economical in spite of its excellent cutting performance. Alternatives are twist drills in which a drill tip made of carbide metal is soldered into a carrier tool which is generally made of tool steel. The disadvantage of these tools, however, is that they can be repainted only to a restricted extent. As soon as the short cutting portion made of cemented carbide metal has been used up, the entire tool has to be scrapped.

European Patent No. 441 302 A1, German Patent No. 196 05 157 A1 and U.S. Pat. No. 5,649,794 describe twist drills in which the tool tip is connected to the base body of the drill with small screws. Compared to the twist drills described above, however, these tools, which are also called "tip cutters", generally have the disadvantage that their stability is reduced on account of the borings that are countersunk into them for the screws. These threaded connections can also interfere with the chip flow. The screws also restrict the potential applications of such drilling tools for small diameter borings. In practice, screws smaller than M2 can no longer be handled on an industrial scale. The prior art also describes drilling tools in which the cutting bodies are held in the carrier tool only by a press-fit (see, for example, German Patent No. 44 35 857 A1 or European Patent No. 460 237 A1). With a solution of that type, however, there is no way to prevent the cutting bodies from coming detached when the drill is extracted from the boring. Such tools are therefore very difficult to use in automated fabrication operations. WO 98/10881 A1 also discloses tools in which the drill tips are connected with the base body in the manner of a bayonet connection. On these drilling tools, of course, the cutting body does not come detached from the base body of the drill when the drill is extracted from the boring, but they are relatively expensive to manufacture.

OBJECT OF THE INVENTION

On the basis of the prior art described above, the object of the invention is a drill that is simple to manufacture, and in which the cutting insert is held securely in the base body of the drill under all operating conditions.

A further object of the invention is a twist drill that is relatively simple to manufacture, and in which the cutting insert is held substantially securely in the base body of the drill under essentially all operating conditions.

SUMMARY OF THE INVENTION

The invention teaches that the objects can be achieved with a drill whereby the cutting insert sits in a receptacle that runs through the base body at a right angle to its longitudinal axis and opens toward the drill tip, and whereby the cutting insert is in contact with the side walls of the receptacle with two essentially diametrically opposite contact surfaces, and whereby between a contact surface of the cutting insert and a side wall of the receptacle there is a groove that extends in the direction of the longitudinal axis of the drill, in which groove a clamping wedge is engaged with a form-fit and a friction fit and interacts with the base body and the cutting insert in the manner of a self-locking device that acts toward the trip of the drill. One advantage of this configuration is that it is relatively easy to assemble. To fix the cutting insert to the base body of the drill, essentially the only action that is necessary is to insert the cutting insert into the receptacle from the drill tip, with the interposition of the clamping wedges. The surfaces that interact with each other in this self-locking connection are finished so that the coefficients of friction required for the self-locking are achieved. Likewise, the wedge angles responsible for the interaction in question are relatively small, i.e. they are less than approximately 10°. An additional advantage is that very high retaining forces are achieved in spite of the ease of assembly. When a drill is extracted from the bore hole, significant forces are exerted on the cutting insert that can even exceed the thrust forces. While with conventional types of fastenings, such as a threaded fastening between the cutting insert and the base body, as the drill is extracted from a bore hole, increasing force is rapidly applied to the threaded connection, thereby weakening it, the situation with the drill taught by the invention is just the opposite. In the drill claimed by the invention, the strength of the connection even increases when an increasing force is exerted on the cutting part, on account of the increasing clamping action of the clamping wedges.

In one advantageous development, the clamping wedges can be the legs of a U-shaped clip. That is an advantage from the point of view of assembly, because the number of parts is reduced. Prior to assembly, the legs of the clip can also be configured so that the outside distance between their outside surfaces is greater than the inside diameter of the receptacle, which means that the spring can be inserted into the receptacle with some bias.

There are basically two ways to create the above mentioned self-locking device by means of the clamping wedges. In the first method, the grooves that receive the legs of the clip are located in the cutting insert. The outside surfaces of the clamping wedges and the areas of the side wall of the receptacle that interact with them run parallel to the longitudinal axis, whereby the inside surfaces of the clamping wedges and the segments of the groove base surface that interact with them each form an acute angle that narrows toward the tip of the drill. The surface quality of the surfaces that interact with each other is thereby selected so that the friction between the outside surfaces of the clamping wedges and the side wall of the receptacle is greater than the friction between the inside surfaces of the clamping wedges and the base surface of the groove. If a force directed toward the tip of the drill is applied to the cutting insert, there is an automatic clamping of the cutting part in the receptacle. The above mentioned angle is in a range from 1° to 8°, and is preferably an angle of 2°.

In another possible embodiment according to the first method of the present invention described in the preceding paragraph, the sides of the receptacle which contact the insert could be positioned at an angle with respect to the longitudinal axis of the drill, such that the end of the receptacle near the drill tip can be larger or smaller than the end of the receptacle near the base of the receptacle, depending on desired drill and/or insert characteristics. The angle could be such that the sides could provide sufficient grip or friction to grip the insert strongly to retain it in the receptacle while the drill is or is not being used. Such an angle to provide sufficient grip could be discovered by experimentation. The range of possible angles could include an angle where the sides of the receptacle are parallel to the longitudinal axis of the drill. The angle could vary according to desired characteristics of the drill and/or the cutting insert, such as drill body diameter, insert diameter, the material comprising the drill or insert, and the coefficient of friction of the contact surfaces of the receptacle or the insert.

In yet another possible embodiment according to the first method of the present invention, the inside surfaces of the clamping wedges, and the segments of the groove base surface that interact with them, each could be parallel to the longitudinal axis or could form an obtuse angle with the longitudinal axis that widens toward the tip of the drill. The angle could vary according to desired characteristics of the drill and/or the cutting insert, such as drill body diameter, insert diameter, and the material comprising the drill or insert.

The second method of creating the above mentioned self-locking device is that when the groove is countersunk into the side wall of the receptacle, the inside surfaces of the clamping wedges and the segments of the contact surface of the cutting insert that interact with them run parallel to the longitudinal axis of the drill, while the outside surfaces of the clamping wedges and the areas of the groove base surface that interact with them form an angle that narrows toward the tip of the drill, whereby the friction between the outside surface of the clamping wedges and the side wall of the receptacle is less than the friction between the inside surface of the clamping wedges and the contact surface of the cutting insert. In this case, too, when a force directed toward the drill tip is exerted on the cutting insert, there is an automatic clamping of the cutting insert in the receptacle of the base body. To make it possible to extract the cutting insert, there is an axial space between the cutting insert and the connecting web of the clip. The cutting insert can be pressed out of the receptacle by means of a tool such as a screwdriver or a similar tool that can be used as a lever and is introduced into this space. The above mentioned tool is thereby held in its position and only the cutting insert is moved, so that the self-locking connection that is created by the clip cannot come detached.

In another possible embodiment according to the second method of the present invention described in the preceding paragraph, the sides of the receptacle and the sides of the clip which contact each other could be positioned at an angle with respect to the longitudinal axis of the drill, such that the end of the receptacle near the drill tip can be larger than or essentially the same size as the end of the receptacle near the base of the receptacle, depending on desired drill and/or insert characteristics. The range of possible angles could include an angle where the sides of the receptacle are parallel to the longitudinal axis of the drill. The angle could vary according to desired characteristics of the drill and/or the cutting insert, such as drill body diameter, insert diameter, the material comprising the drill or insert, and the coefficient of friction of the contact surfaces of the receptacle, the clip, or the insert.

In yet another possible embodiment according to the second method of the present invention, the contact surfaces of the insert, and the surfaces of the clip that interact with them, each could be positioned to form an obtuse or an acute angle with the longitudinal axis, such that the width of the insert increases or decreases toward the tip of the drill. The angle could vary according to desired characteristics of the drill and/or the cutting insert, such as drill body diameter, insert diameter, and the material comprising the drill or insert.

The cutting insert or its contact surfaces and the side wall of the receptacle that interacts with it are shaped so that the cutting insert is retained in the receptacle with a form-fit that is effective in the radial direction.

In yet still another possible embodiment according to the present invention, a lever-type tool or twist-type tool could be used to remove the cutting insert. The tool could be inserted into an opening or groove in the base of the receptacle, then could be pushed downward in a levering motion to push out the cutting insert. The tool could also be designed to be twisted in the groove, such as a T-shaped tool, which twisting could push out the cutting insert.

In at least one additional possible embodiment according to the present invention, the contact surfaces or sides of the cutting insert may not be diametrically opposite one another. They could essentially be diametrically opposite, but the surfaces may not be exactly parallel and could lie at an angle with respect to one another. The receptacle could also be correspondingly shaped for variously shaped inserts other than those inserts where the contact surfaces of the insert are diametrically opposite.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below and with reference to the exemplary embodiments illustrated in the enclosed drawings, in which:

FIG. 2 is a side view of a cutting insert;

FIG. 3 is a plan view in the direction of Arrow III in FIG. 2;

FIG. 4 is a longitudinal section along Line IV—IV in FIG. 3;

FIG. 8 is a side view of an alternatively configured cutting insert;

FIG. 9 is a plan view in the direction of Arrow IX in FIG. 8;

FIG. 10 is a longitudinal section along Line X—X in FIG. 9; and

DESCRIPTION OF THE PREFERRED EMBODIMENT

Figure 1:
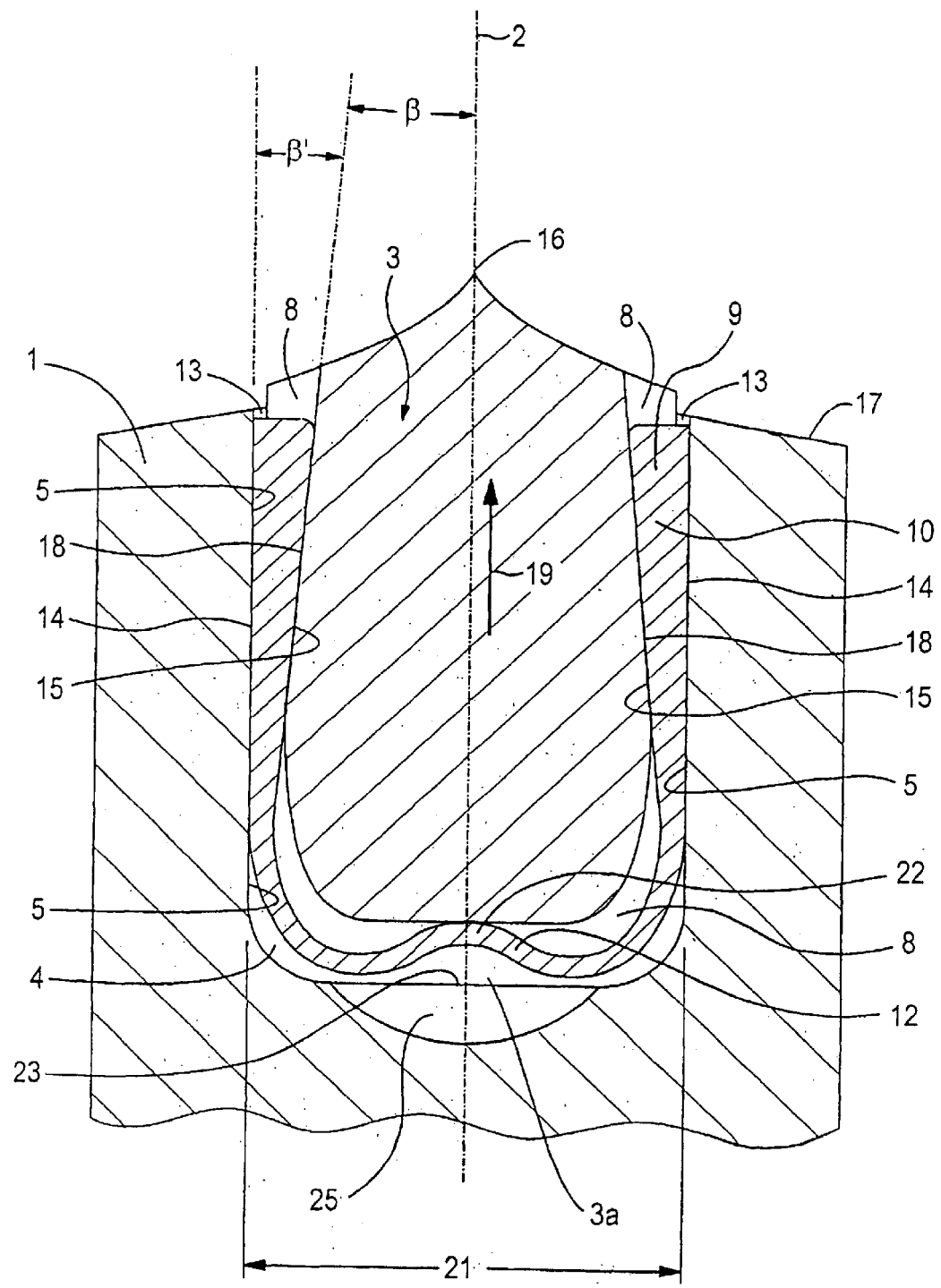
FIG. 1 is an axial section through the top area of a first exemplary embodiment of a drill as claimed by the invention.
Figure 5:
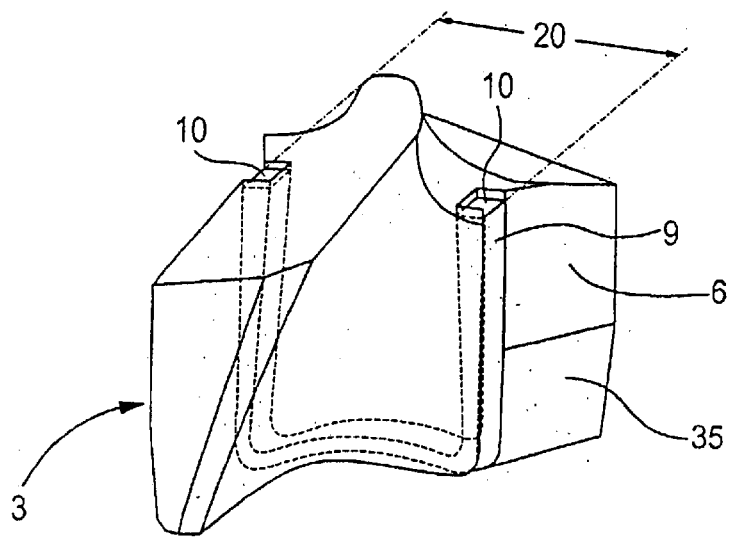
FIG. 5 is a view in perspective of a cutting insert with a clip.

The drill illustrated in FIG. 1 has a base body 1 and a receptacle 4 which carries a cutting insert 3. The recess in the tip area of the base body 1 that forms the receptacle 4 becomes wider toward the end surface 17 of the base body 1 and extends through the base body at a right angle to the longitudinal axis 2 of the drill. As shown in the plan view in FIG. 3, the cutting insert 3 has lateral contact surfaces 11 that interact in a form-fitting manner with the side wall 5 of the receptacle 2. The contact surfaces 11 are composed of two prismatic surfaces 6, 7 that enclose an obtuse angle α. The prismatic surfaces 7—7 and 6—6 are arranged diametrically opposite each other in pairs and run parallel to each other. The side wall 5 of the receptacle 4 has a complementary configuration, so that the cutting insert is fixed in position in the base body by its form fit in the radial direction. At the point where the two prismatic surfaces 6, 7 contact one another, there is a groove 8 in the cutting insert 3 that extends in the direction of the longitudinal axis 2. As shown in the cross section in FIG. 1, the groove has a U-shape when viewed in longitudinal section. In other words, it extends to the end surface 3a of the cutting insert 3 away from the tip, and also extends beyond this end surface. An essentially U-shaped clip 9 is inserted into the groove. The two legs 10 of the clip 9 are realized in a wedge shape. The legs 10 are connected to each other by a connecting web 12. The receptacle 4 and its side wall 5 are realized so that there is a radial separation in the vicinity of the groove 8 or of the clip 9. On the other hand, the legs 10 of the clip 9 are sized so that they are in frictional contact with their outside surfaces 14 against the side wall 5.

The outside surfaces 14 of the clamping wedges or legs 10 of the clip 9, viewed in longitudinal section as in FIG. 1, run parallel to the longitudinal axis 2. The same is true for the surface areas of the side wall 5 that interact with them. The inside surfaces 15 of the legs 10 run at an angle and with the longitudinal axis form an angle β that becomes narrower toward the drill tip 16. Accordingly, the inside surfaces 15 and the outside surfaces 14 of the legs 10 form an angle α' that becomes wider toward the drill tip 16. The legs 10 therefore become thicker in a wedge shape toward the tip of the drill. The legs 10 end at some axial distance from the end surfaces 17 of the base body 1. The surfaces of the legs, the cutting insert 3 and the receptacle 4 that interact with one another are finished so that the friction between the outside surfaces 14 of the legs 10 and of the side wall 5 is greater than the friction between the inside surface 15 of the legs 10 and the base surface 18 of the groove (FIGS. 1, 3). This configuration guarantees that when a force is applied to the cutting insert in the direction indicated by the arrow 19, the cutting insert will be clamped firmly in the receptacle 4.

As shown in the figures, the installation of the cutting insert 3 is simple. First the clip 9 is inserted into the groove 8 and then the cutting insert with the clip is inserted into the receptacle 4. The width 20 (FIG. 4) of the clip 9, prior to assembly, is greater than the inside diameter 21 of the receptacle 4, so that when assembled, the legs 10 are pressed against the side wall 5 with some bias. As a result of this configuration, at least a preliminary fixing of the cutting insert is guaranteed, without the need to exert force on the cutting insert in the direction indicated by the arrow 19. The connecting web 12 has a central segment 22 which is cambered toward the drill tip 16, and which supports the elastic bias of the clip legs 10. To remove the cutting insert 3 from the receptacle 4, a tool 24 similar to a screwdriver can be inserted into a bevel or recess 25 that extends radially outward in the base 23 of the receptacle. The tool is applied to the clip 9 so that the self-locking device cannot come detached.

To further explain, a lever-type tool or twist-type tool could be used to remove the cutting insert. The tool could be inserted into an opening, groove or recess 25 in the base 23 of the receptacle, then could be pushed downward in a levering motion to push out the cutting insert. The tool could also be designed to be twisted in the groove, which twisting could also push out the cutting insert.

Figure 7:
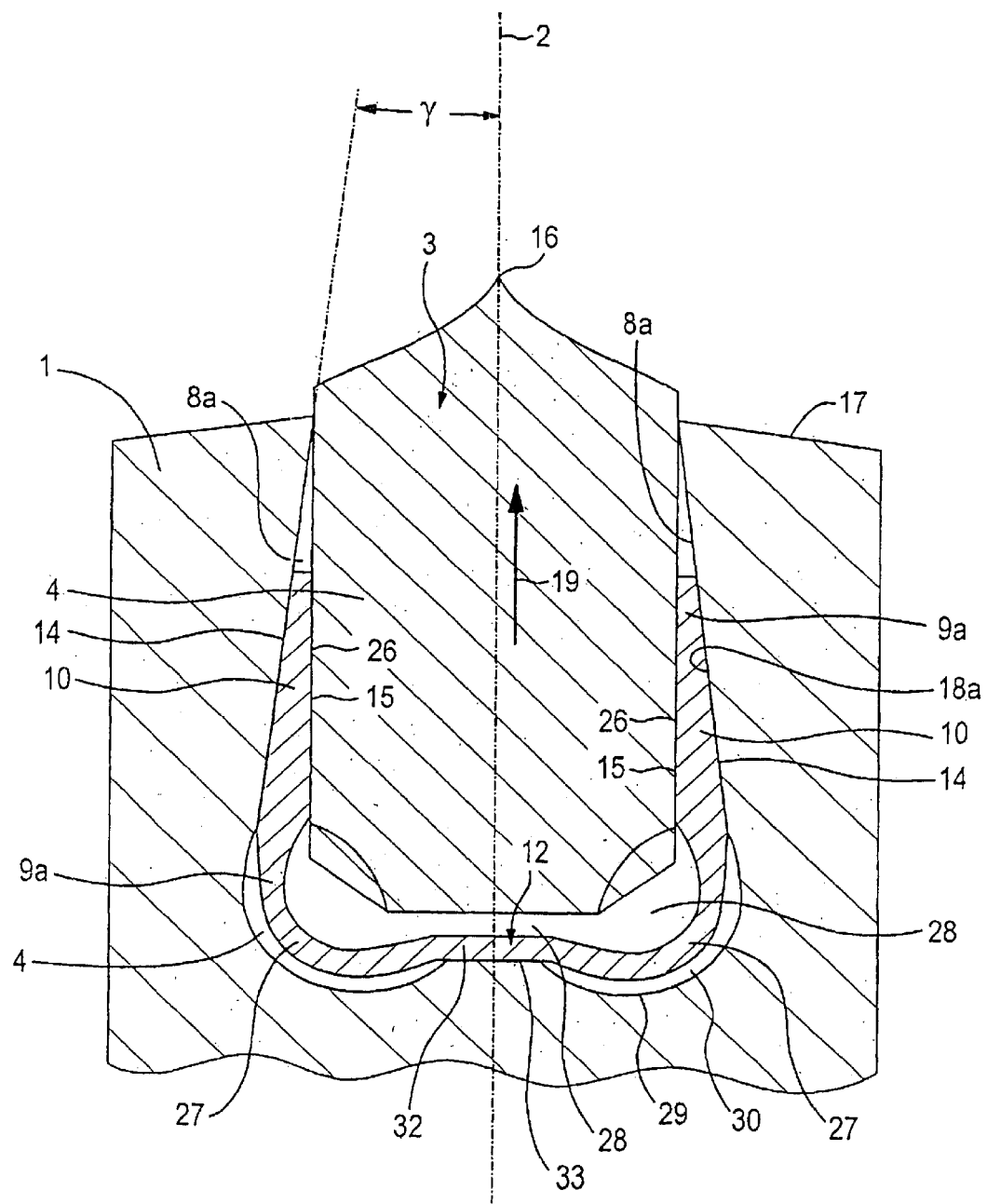
FIG. 7 is a longitudinal section through the tip area of a second exemplary embodiment of the drill claimed by the invention.

In the exemplary embodiment illustrated in FIG. 7, the groove 8a that holds the clip 9a is countersunk into the base body or into the side wall 5 of the receptacle 4. The inside surfaces 15 of the legs 10 and the areas of the contact surfaces 11 that interact with the inside surfaces run parallel to the longitudinal axis 2. The outside surfaces 14 of the legs, on the other hand, form an angle γ with the longitudinal axis 2 that narrows toward the drill tip 16. The base surface 18a of the groove 8a in the base body 1 has a corresponding diagonal position. The surfaces that interact to form a self-locking device are thereby finished so that the friction between the outside surface 14 and the groove base surface 18 is less than the friction between the inside surface 15 of the legs 10 and the surface areas 26 of the cutting insert 3 that interact with the inside surface. When a force is applied to the cutting insert 3 in the direction indicated by the arrow 19, there is thus an automatic clamping of the cutting insert 3 in the receptacle 4.

To make it possible to extract the cutting insert 3 from the receptacle 4, between the connecting web 12 of the clip 9 and the cutting insert 3 there is a space 28 into which a tool similar to a screwdriver can be introduced. It is thereby possible to move the cutting insert 3 in the direction indicated by the arrow 19, whereby the clip 9 remains in its position, as a result of which the self-locking action of the clip 9 is neutralized.

The areas 29 of the receptacle 4 that are next to the rounded corners 27 are hollowed out in the shape of a gutter, so that a cavity 39 is formed between the corners 27 and the receptacle wall. The central segment 32 of the connecting web 12 located between the rounded corners 27 is supported against a support projection 33 that projects in the direction of the drill tip 16 between the areas 29.

The prismatic surfaces 6, 7, as illustrated in FIG. 2, can have a chamfered longitudinal segment 35 that extends approximately from their centers toward their base surface 34, which facilitates the introduction of the cutting insert into the receptacle 4.

In the exemplary embodiment of a cutting insert 3a illustrated in FIGS. 8 to 10, corresponding to the example illustrated in FIG. 3, there are two prismatic surfaces 6a that are diametrically opposite each other and run parallel to each other. In this exemplary embodiment, however, the second prismatic surface 7a that forms an oblique angle α with the first prismatic surface is not formed by the cutting insert 3 itself, but by the outside surface 14a of the legs 10. The surface areas of the receptacle 4 that interact with the prismatic surfaces 6a and 7a are realized complementary to these surfaces, so that the cutting insert 3a is inserted with a form-fit in the receptacle 4 that is effective in the radial direction.

Figure 6:
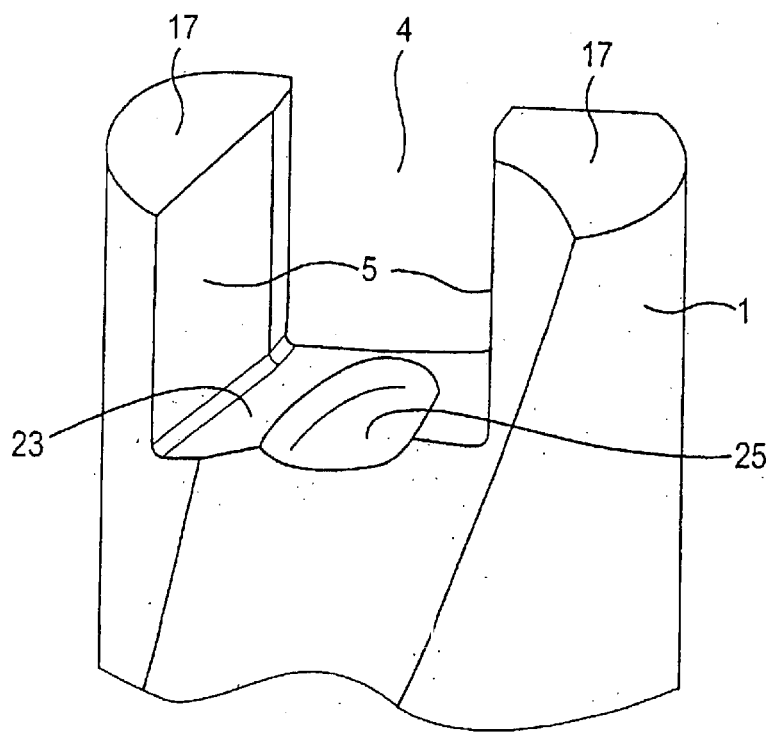
FIG. 6 shows the tip area of the base body of a drill with the cutting insert removed.
Figure 11:
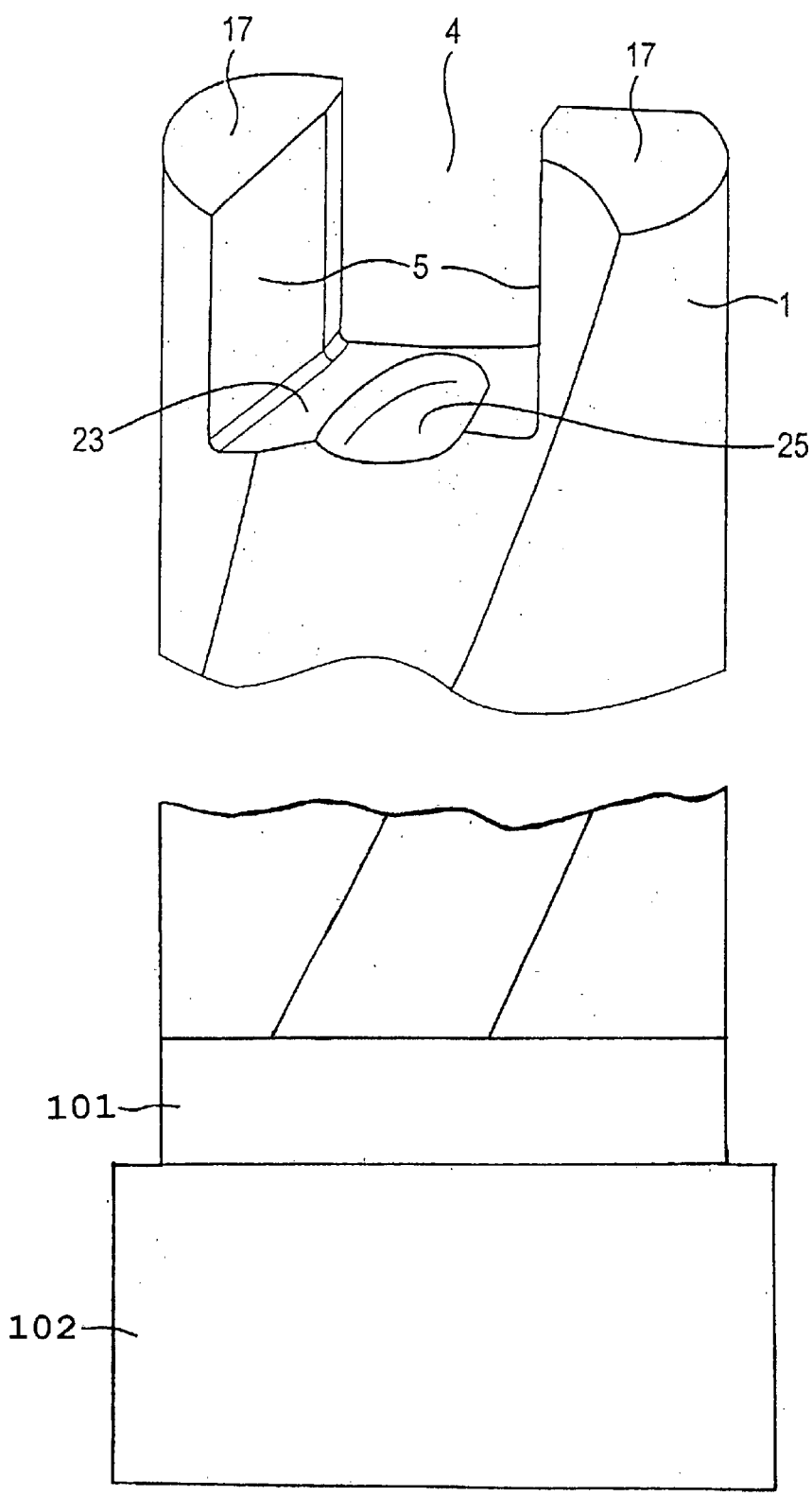
FIG. 11 is a view similar to FIG. 6, but showing an entire drill body.

FIG. 11 is a view similar to FIG. 6, but showing an entire drill having a shank 101 and a holder 102.

One feature of the invention resides broadly in a drill with a base body 1 and a replaceable cutting insert 3, whereby the cutting insert sits in a receptacle 4 that runs through the base body at a right angle to its longitudinal axis 2 and opens toward the drill tip 16, and whereby the cutting insert 3 is in contact with the side walls 5 of the receptacle 4 with two diametrically opposite contact surfaces, characterized by the fact that between each contact surface of the cutting insert 3 and a side wall 5 of the receptacle, there is a groove 8 that extends in the direction of the longitudinal axis 2, in which groove a clamping wedge sits with a form-fit and a friction-fit and interacts with the base body 1 and the cutting insert 3 in the manner of a self-locking device that is effective toward the drill tip 16.

Another feature of the invention resides broadly in the drill as claimed, characterized by the fact that the clamping wedges are the legs 10 of a U-shaped clip 9.

Yet another feature of the invention resides broadly in a drill the claimed, characterized by the fact that the grooves 8 are located in the cutting insert, and that the outside surfaces 14 of the clamping wedges and the areas of the side walls of the receptacle 4 that interact with them run parallel to the longitudinal axis 2, and that the inside surfaces 15 of the clamping wedges and the segments of the groove base surface 18 that interact with them each form an angle β that becomes narrower toward the drill tip, whereby the friction between the outside surfaces 14 and the side wall 5 is greater than the friction between the inside surface 15 and the base surface 18 of the groove.

Still another feature of the invention resides broadly in the drill as claimed characterized by an angle β of 1° to 8°.

A further feature of the invention resides broadly in the drill as claimed, characterized by the fact that the connecting web 12 of the clip 9 running between the legs 10 is cambered in its middle segment toward the drill tip.

Another feature of the invention resides broadly in the drill as claimed, characterized by the fact that the grooves 8a are countersunk into the side wall 5 of the cutting insert 3 and that the inside surfaces 15 of the clamping wedges and the portions of the contact areas of the cutting insert 3 that interact with them run parallel to the longitudinal axis 2 of the drill, and that the outside surfaces 14 of the clamping wedges and the groove base surface 18a that interacts with them each form an angle γ that narrows toward the drill tip 16, whereby the friction between the outside surface 14 and the groove base surface 18a is less than the friction between the inside surface 15 and the contact surface of the cutting part 3.

Yet another feature of the invention resides broadly in the drill as claimed, characterized by the fact that there is an axial space 28 between the cutting insert 3 and the connecting web 12 of the clip 9.

Still another feature of the invention resides broadly in the drill as claimed, characterized by the fact that the clip 9 sits in the receptacle 4 under an elastic bias, whereby the outside surfaces 14 of the clamping wedges press against the side walls 5 of the receptacle 4.

A further feature of the invention resides broadly in the drill as claimed, characterized by the fact that the cutting insert 3 sits in the receptacle 4 with a radially effective form fit.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated-by reference as if set forth in their entirety herein.

The corresponding foreign and international patent publication applications, namely, Federal Republic of Germany Patent Application No. 199 14 170.3, filed on Mar. 29, 1999, having inventor Ulrich KRENZER, and DE-OS 199 14 170.3, having inventor Ulrich KRENZER, and DE-PS 199 14 170.3, having inventor Ulrich KRENZER, and International Application No. PCT/EP00/02515, filed on Mar. 22, 2000, having inventor Ulrich KRENZER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

The following U.S. patents regarding drills and/or drill inserts are hereby incorporated by reference as if set forth in their entirety herein: U.S. Pat. No. 5,800,100, having attorney docket no. NHL-KEH-03-NP, issued to Krenzer on Sep. 1, 1998; NHL-KEH-06, issued to Kammermeier on Nov. 3, 1998; U.S. Pat. No. 5,967,710, having attorney docket no. NHL-KEH-02-NP, issued to Krenzer on Oct. 9, 1999; U.S. Pat. No. 6,045,301, having attorney docket no. NHL-KEH-04 US, issued to Kammermeier et al. on Apr. 4, 2000; U.S.

Pat. No. 6,116,825, having attorney docket no. NHL-KEH-05 US, issued to Kammermeier et al. on Sep. 12, 2000; U.S. Pat. No. 6,164,879, having attorney docket no. NHL-KEH-02-NP-D, issued to Krenzer on Dec. 26, 2000; U.S. Pat. No. 6,210,083, having attorney docket no. NHL-KEH-05-C US, issued to Kammermeier et al. on Apr. 3, 2001; and U.S. Pat. No. 6,231,276, having attorney docket no. NHL-KEH-09 US, issued to Müller et al. on May 15, 2001.

The following U.S. patent applications regarding drills and/or drill inserts are hereby incorporated by reference as if set forth in their entirety herein: Ser. No. 08/809,839, having attorney docket no. NHL-KEH-08, having inventors Ulrich KRENZER, Gebhard MÜLLER, and Horst JAGER, filed on Apr. 2, 1997; Ser. No. 09/471,768, having attorney docket no. NHL-KEH-12 US, having inventor Bernhard BORSCHERT, filed on Dec. 23, 1999; Ser. No. 09/521,134, having attorney docket no. NHL-KEH-13 US, having inventors Gebhard MÜLLER and Horst JAGER, filed on Mar. 8, 2000; Ser. No. 09/927,921, having attorney docket no. NHL-KEH-14 US, having inventors Bernhard Walter BORSCHERT, Jochen STIES, Dieter Hermann MUHLFRIEDEL, and Karl-Heinz WENDT, filed on Aug. 10, 2001; and Ser. No. 09/935,078, having attorney docket no. NHL-KEH-15, having inventors Hans-Wilm HEINRICH, Manfred WOLF, and Dieter SCHMIDT, filed on Aug. 22, 2001.

Some examples of steels that may be utilized or adapted for use in at least one possible embodiment of the present invention may be found in the following U.S. Pat. No. 4,222,799, issued to Hijikata et al. on Sep. 16, 1980; U.S. Pat. No. 4,575,912, issued to Grip et al. on Mar. 18, 1986; U.S. Pat. No. 5,009,843, issued to Sugimoto et al. on Apr. 23, 1991; U.S. Pat. No. 5,118,469, issued to Abe et al. on Jun. 2, 1992; U.S. Pat. No. 5,286,312, issued to Shimotsusa et al. on Feb. 15, 1994; U.S. Pat. No. 5,575,973, issued to Choi et al. on Nov. 19, 1996; U.S. Pat. No. 5,643,532, issued to Ito on Jul. 1, 1997; U.S. Pat. No. 5,776,267, issued to Nanba et al. on Jul. 7, 1998; U.S. Pat. No. 5,846,344, issued to Kawaguchi et al. on Dec. 8, 1998; U.S. Pat. No. 5,897,717, issued to Hashimura et al. on Apr. 27, 1999; and U.S. Pat. No. 5,951,944, issued to Motomura et al. on Sep. 14, 1999.

Some examples of twist drills that may be utilized or adapted for use in at least one possible embodiment of the present invention may be found in the following U.S. Pat. No. 4,209,275, issued to Kim on Jun. 24, 1980; U.S. Pat. No. 4,556,347, issued to Barish on Dec. 3, 1985; U.S. Pat. No. 4,688,972, issued to Kubota on Aug. 25, 1987; U.S. Pat. No. 4,756,650, issued to Wakihira et al. on Jul. 12, 1988; U.S. Pat. No. 4,762,445, issued to Bunting et al. on Aug. 9, 1988; U.S. Pat. No. 5,230,593, issued to Imanaga et al. on Jul. 27, 1993; U.S. Pat. No. 5,350,261, issued to Takaya et al. on Sep. 27, 1994; U.S. Pat. No. 5,442,979, issued to Hsu on Aug. 22, 1995; U.S. Pat. No. 5,678,960, issued to Just et al. on Oct. 21, 1997; U.S. Pat. No. 5,931,615, issued to Wiker on Aug. 3, 1999; and U.S. Pat. No. 6,283,682, issued to Plummer on Sep. 4, 2001.

Some examples of other drills and drill inserts, features of which may be utilized or adapted for use in at least one possible embodiment of the present invention may be found in the following U.S. Pat. No. 4,072,438, issued to Powers on Feb. 7, 1978; U.S. Pat. No. 4,131,383, issued to Powers on Dec. 26, 1978; U.S. Pat. No. 4,220,429, issued to Powers et al. on Sep. 2, 1980; U.S. Pat. No. 4,563,113, issued to Ebenhoch on Jan. 7, 1986; No. 5,173,014, issued to Agapiou et al. on Dec. 22, 1992; U.S. Pat. No. 5,236,291, issued to Agapiou et al. on Aug. 17, 1993; U.S. Pat. No. 5,807,041, issued to Lindblom on Sep. 15, 1998; U.S. Pat. No. 5,947,659, issued to Mays on Sep. 7, 1999; and U.S. Pat. No. 6,071,046, issued to Hecht et al. on Jun. 6, 2000.

Some examples of drills and/or drill bits with tungsten carbide that may be utilized or adapted for use in at least one possible embodiment of the present invention may be found in the following U.S. Pat. No. 6,135,218, issued to Deane et al. on Oct. 24, 2000; U.S. Pat. No. 6,029,544, issued to Katayama on Feb. 29, 2000; U.S. Pat. No. 5,979,571, issued to Scott et al. on Nov. 9, 1999; U.S. Pat. No. 5,836,409, issued to Vail, III on Nov. 17, 1998; U.S. Pat. No. 4,241,483, issued to Voitas on Dec. 30, 1980; U.S. Pat. No. 4,200,159, issued to Peschel et al. on Apr. 29, 1980; and U.S. Pat. No. 4,169,637, issued to Voitas on Oct. 2, 1979.

Some examples of drills and/or drill bits with titanium carbide that may be utilized or adapted for use in at least one possible embodiment of the present invention may be found in the following U.S. Pat. No. 5,882,152, issued to Janitzki on Mar. 16, 1999 and U.S. Pat. No. 4,211,294, issued to Multakh on Jul. 8, 1980.

Some examples of high strength steel that may be utilized or adapted for use in at least one possible embodiment of the present invention may be found in the following U.S. Pat. No. 4,578,113, issued to Rana et al. on Mar. 25, 1986; U.S. Pat. No. 4,720,307, issued to Matsumoto et al. on Jan. 19, 1988; U.S. Pat. No. 4,814,141, issued to Imai et al. on Mar. 21, 1989; U.S. Pat. No. 4,826,543, issued to Yano et al. on May 2, 1989; U.S. Pat. No. 4,956,025, issued to Koyama et al. on Sep. 11, 1990; U.S. Pat. No. 5,651,938, issued to Thomson et al. on Jul. 29, 1997; U.S. Pat. No. 5,772,957, issued to Thomson et al. on Jun. 30, 1998; and U.S. Pat. No. 5,798,004, issued to Tamehiro et al. on Aug. 25, 1998.

The invention as described hereinabove in the context of the preferred embodiments is not to be taken as limited to all of the provided details thereof, since modifications and variations thereof may be made without departing from the spirit and scope of the invention.

| AT LEAST PARTIAL NOMENCLATURE | |
| --- | --- |
| 1 | Base body |
| 2 | Longitudinal axis |
| 3 | Cutting insert |
| 3a | End surface |
| 4 | Receptacle |
| 5 | Side wall |
| 6 | Prismatic surface |
| 7 | Prismatic surface |
| 8 | Groove |
| 9 | Clip |
| 10 | Leg |
| 11 | Contact surface |
| 12 | Connecting web |
| 13 | Radial clearance |
| 14 | Outside surface |
| 15 | Inside surface |
| 16 | Drill tip |
| 17 | End surface |
| 18 | Groove base surface |
| 19 | Arrow |
| 20 | Width |
| 21 | Inside diameter |
| 22 | Segment |
| 23 | Base |
| 25 | Recess |
| 26 | Surface area |
| 27 | Corner |
| 28 | Space |

-continued

AT LEAST PARTIAL NOMENCLATURE

| | |
|---|---|
| 29 | Area |
| 30 | Cavity |
| 31 | Central segment |
| 33 | Support projection |
| 34 | Base surface |
| 35 | Longitudinal segment |
| α | Angle |
| β | Angle |
| γ | Angle |

What is claimed is:

1. A drill with a base body (1) and a replaceable cutting insert (3), whereby the cutting insert sits in a receptacle (4) that runs through the base body at a right angle to its longitudinal axis (2) and opens toward the drill tip (16), and whereby the cutting insert (3) is in contact with the side walls (5) of the receptacle (4) with two diametrically opposite contact surfaces, characterized by the fact that between each contact surface of the cutting insert (3) and a side wall (5) of the receptacle, there is a groove (8) that extends in the direction of the longitudinal axis (2), in which groove a clamping wedge sits with a form-fit and a friction-fit and interacts with the base body (1) and the cutting insert (3) in the manner of a self-locking device that is effective toward the drill tip (16).

2. The drill as claimed in claim 1, characterized by the fact that the clamping wedges are the legs (10) of a U-shaped clip (9).

3. The drill as claimed in claim 2, characterized by the fact that the grooves (8) are located in the cutting insert, and that the outside surfaces (14) of the clamping wedges and the areas of the side walls of the receptacle (4) that interact with them run parallel to the longitudinal axis (2), and that the inside surfaces (15) of the clamping wedges and the segments of the groove base surface (18) that interact with them each form an angle (β) that becomes narrower toward the drill tip, whereby the friction between the outside surfaces (14) and the side wall (5) is greater than the friction between the inside surface (15) and the base surface (18) of the groove.

4. The drill as claimed in claim 3, characterized by an angle (β) of 1° to 8°.

5. The drill as claimed in claim 4, characterized by the fact that the connecting web (12) of the clip (9) running between the legs (10) is cambered in its middle segment toward the drill tip.

6. The drill as claimed in claim 2, characterized by the fact that the grooves (8a) are countersunk into the side wall (5) of the cutting insert (3) and that the inside surfaces (15) of the clamping wedges and the portions of the contact areas of the cutting insert (3) that interact with them run parallel to the longitudinal axis (2) of the drill, and that the outside surfaces (14) of the clamping wedges and the groove base surface (18a) that interacts with them each form an angle (γ) that narrows toward the drill tip (16), whereby the friction between the outside surface (14) and the groove base surface (18a) is less than the friction between the inside surface (15) and the contact surface of the cutting part (3).

7. The drill as claimed in claim 6, characterized by the fact that there is an axial space (28) between the cutting insert (3) and the connecting web (12) of the clip (9).

8. The drill as claimed in claim 7, characterized by the fact that the clip (9) sits in the receptacle (4) under an elastic bias, whereby the outside surfaces (14) of the clamping wedges press against the side walls (5) of the receptacle (4).

9. The drill as claimed in claim 8, characterized by the fact that the cutting insert (3) sits in the receptacle (4) with a radially effective form fit.

10. The drill as claimed in claim 1, characterized by the fact that the grooves (8) are located in the cutting insert, and that the outside surfaces (14) of the clamping wedges and the areas of the side walls of the receptacle (4) that interact with them run parallel to the longitudinal axis (2), and that the inside surfaces (15) of the clamping wedges and the segments of the groove base surface (18) that interact with them each form an angle (β) that becomes narrower toward the drill tip, whereby the friction between the outside surfaces (14) and the side wall (5) is greater than the friction between the inside surface (15) and the base surface (18) of the groove.

11. The drill as claimed in claim 3, characterized by the fact that the connecting web (12) of the clip (9) running between the legs (10) is cambered in its middle segment toward the drill tip.

12. The drill as claimed in claim 1, characterized by the fact that the grooves (8a) are countersunk into the side wall (5) of the cutting insert (3) and that the inside surfaces (15) of the clamping wedges and the portions of the contact areas of the cutting insert (3) that interact with them run parallel to the longitudinal axis (2) of the drill, and that the outside surfaces (14) of the clamping wedges and the groove base surface (18a) that interacts with them each form an angle (γ) that narrows toward the drill tip (16), whereby the friction between the outside surface (14) and the groove base surface (18a) is less than the friction between the inside surface (15) and the contact surface of the cutting part (3).

13. The drill as claimed in claim 10, characterized by the fact that the clip (9) sits in the receptacle (4) under an elastic bias, whereby the outside surfaces (14) of the clamping wedges press against the side walls (5) of the receptacle (4).

14. The drill as claimed in claim 1, characterized by the fact that the cutting insert (3) sits in the receptacle (4) with a radially effective form fit.

15. The drill as claimed in claim 2, characterized by the fact that the clip (9) sits in the receptacle (4) under an elastic bias, whereby the outside surfaces (14) of the clamping wedges press against the side walls (5) of the receptacle (4).

16. The drill as claimed in claim 2, characterized by the fact that the cutting insert (3) sits in the receptacle (4) with a radially effective form fit.

17. The drill as claimed in claim 3, characterized by the fact that the clip (9) sits in the receptacle (4) under an elastic bias, whereby the outside surfaces (14) of the clamping wedges press against the side walls (5) of the receptacle (4).

18. The drill as claimed in claim 3, characterized by the fact that the cutting insert (3) sits in the receptacle (4) with a radially effective form fit.

19. The drill as claimed in claim 4, characterized by the fact that the clip (9) sits in the receptacle (4) under an elastic bias, whereby the outside surfaces (14) of the clamping wedges press against the side walls (5) of the receptacle (4).

20. The drill as claimed in claim 4, characterized by the fact that the cutting insert (3) sits in the receptacle (4) with a radially effective form fit.

* * * * *